US012228872B2

(12) United States Patent
Shimodaira et al.

(10) Patent No.: US 12,228,872 B2
(45) Date of Patent: Feb. 18, 2025

(54) IMAGE FORMING DEVICE CONVEYING SHEET IN A NON-CONTACT STATE BETWEEN A PREHEATING UNIT AND A MAIN FIXING UNIT

(71) Applicant: FUJIFILM Business Innovation Corp., Tokyo (JP)

(72) Inventors: Yoshiki Shimodaira, Ebina (JP); Takayuki Yamashita, Ebina (JP); Masato Yamashita, Ebina (JP); Tokuya Sakamoto, Ebina (JP); Kosuke Yamada, Ebina (JP); Tetsuro Kodera, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 227 days.

(21) Appl. No.: 17/337,522

(22) Filed: Jun. 3, 2021

(65) Prior Publication Data

US 2021/0286304 A1 Sep. 16, 2021

Related U.S. Application Data

(63) Continuation of application No. PCT/JP2019/031882, filed on Aug. 13, 2019.

(30) Foreign Application Priority Data

Feb. 13, 2019 (JP) ................................ 2019-023906

(51) Int. Cl.
*G03G 15/23* (2006.01)
*G03G 15/00* (2006.01)
*G03G 15/20* (2006.01)

(52) U.S. Cl.
CPC .......... *G03G 15/234* (2013.01); *G03G 15/20* (2013.01); *G03G 15/2021* (2013.01);
(Continued)

(58) Field of Classification Search
CPC ............ G03G 15/234; G03G 15/6558; G03G 15/2021; G03G 15/235; G03G 15/657
See application file for complete search history.

(56) References Cited

U.S. PATENT DOCUMENTS 5,572,290 A 11/1996 Ueno et al.
6,587,667 B2 * 7/2003 Hauptmann ....... G03G 15/2007 399/400

(Continued)

FOREIGN PATENT DOCUMENTS

JP H04-051277 A 2/1992
JP H06-184553 A 7/1994

(Continued)

OTHER PUBLICATIONS

Machine Translation of WO-2009088047-A1 (Year: 2009).*

(Continued)

*Primary Examiner* — Arlene Heredia
(74) *Attorney, Agent, or Firm* — Oliff PLC

(57) ABSTRACT

An image forming device, includes: a transfer unit that transfers a toner image onto a recording medium being conveyed; a main heating unit that is disposed at a downstream side of the transfer unit in a conveyance direction of the recording medium, heats the recording medium in contact with the recording medium, and fixes the toner image to the recording medium; a reversing unit that reverses front and back of the recording medium having the toner image fixed on a first surface of the recording medium by the main heating unit, and sends the recording medium to the transfer unit; a preheating unit that is arranged between the transfer unit and the main heating unit in the conveyance direction of the recording medium and heats the recording medium in a non-contact state, the preheating unit being configured to heat the recording medium so that, when the recording medium that is sent to the transfer unit by the reversing unit (Continued)

and on which the toner image is transferred to a second surface is heated, a temperature of the first surface of the recording medium is higher than a softening point of a toner before the recording medium is heated by the main heating unit; and a non-contact unit that brings a toner image forming region on the first surface of the recording medium on which the toner image is transferred onto the second surface and a member other than the recording medium between the preheating unit and the main heating unit in a non-contact state.

2 Claims, 10 Drawing Sheets

(52) U.S. Cl.
CPC ....... *G03G 15/2053* (2013.01); *G03G 15/657* (2013.01); *G03G 15/5054* (2013.01)

(56) References Cited

U.S. PATENT DOCUMENTS

| | | | |
|---|---|---|---|
| 2009/0039179 | A1 | 2/2009 | Kado et al. |
| 2010/0008683 | A1 | 1/2010 | Yoshikawa |

FOREIGN PATENT DOCUMENTS

| | | | | | |
|---|---|---|---|---|---|
| JP | H08-050429 | A | | 2/1996 | |
| JP | H10-133506 | A | | 5/1998 | |
| JP | 2000-305385 | A | | 11/2000 | |
| JP | 2000-321922 | A | | 11/2000 | |
| JP | 2004-276022 | A | | 10/2004 | |
| JP | 2008-262069 | A | | 10/2008 | |
| JP | 2011-039148 | A | | 2/2011 | |
| WO | 2005/059658 | A1 | | 6/2005 | |
| WO | WO-2009088047 | A1 | * | 7/2009 | ........... G03G 15/235 |
| WO | WO-2021054292 | A1 | * | 3/2021 | ........... B65H 29/042 |

OTHER PUBLICATIONS

Oct. 25, 2022 Extended European Search Report issued in European Patent Application No. 19914809.9.

Oct. 8, 2019 Search Report issued in International Patent Application No. PCT/JP2019/031882.

Oct. 8, 2019 Written Opinion issued in International Patent Application No. PCT/JP2019/031882.

Jul. 6, 2023 Office Action issued in Chinese Patent Application No. 201980088260.X.

Sep. 19, 2023 Office Action issued in Japanese Patent Application No. 2019-229602.

* cited by examiner

FIG. 7

| | TEMPERATURE OF FIRST SURFACE (℃) | GLOSSINESS |
|---|---|---|
| COMPARATIVE EXAMPLE 1 | 60 | 45 |
| COMPARATIVE EXAMPLE 2 | 70 | 45 |
| EXAMPLE 1 | 80 | 57 |
| EXAMPLE 2 | 90 | 65 |

IMAGE FORMING DEVICE CONVEYING SHEET IN A NON-CONTACT STATE BETWEEN A PREHEATING UNIT AND A MAIN FIXING UNIT

CROSS REFERENCE TO RELATED APPLICATION

This is a continuation of International Application No. PCT/JP2019/031882 filed on Aug. 13, 2019, and claims priority from Japanese Patent Application No. 2019-23906 filed on Feb. 13, 2019.

BACKGROUND

Technical Field

The present invention relates to an image forming device.

Related Art

The electrophotographic system described in JP-A-H08-50429 sets a printing speed used in a case where plural electrophotographic devices are connected to perform printing and a printing speed used in a case where plural electrophotographic devices are made independent of each other and printing is performed by separate electrophotographic devices, and includes a printing speed switching unit that switches between the printing speeds.

SUMMARY

In the related art, when images are formed on both sides of a recording medium, first, a preheating unit heats the recording medium on which a toner image has been transferred to a first surface in a non-contact state, and a main heating unit comes into contact with the recording medium, and fixes the image to the first surface of the recording medium heated by the preheating unit. Next, the toner image is transferred to a second surface of the recording medium, and the preheating unit heats the recording medium on which the toner image is transferred to the second surface in a non-contact state. Further, the main heating unit comes into contact with the recording medium, and fixes the toner image to the second surface of the recording medium heated by the preheating unit.

When the preheating unit heats the recording medium on which the toner image is transferred to the second surface, the temperature of the first surface of the recording medium becomes equal to or higher than a softening point of a toner, and the toner constituting the toner image on the first surface becomes soft. Therefore, when an image forming region of the first surface of the recording medium comes into contact with a member other than the recording medium between the preheating unit and the main heating unit, the toner image on the first surface is damaged.

Aspects of non-limiting embodiments of the present disclosure relate to suppressing damage of the toner image formed on the first surface between the preheating unit and the main heating unit in a configuration in which the temperature of the first surface of the recording medium is equal to or higher than the softening point of the toner when the preheating unit heats the recording medium on which the toner image is transferred to the second surface as compared with a case in which the image forming region of the first surface of the recording medium comes into contact with a member other than the recording medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming device including: a transfer unit that transfers a toner image onto a recording medium being conveyed; a main heating unit that is disposed at a downstream side of the transfer unit in a conveyance direction of the recording medium, heats the recording medium in contact with the recording medium, and fixes the toner image to the recording medium; a reversing unit that reverses front and back of the recording medium having the toner image fixed on a first surface of the recording medium by the main heating unit, and sends the recording medium to the transfer unit; a preheating unit that is arranged between the transfer unit and the main heating unit in the conveyance direction of the recording medium and heats the recording medium in a non-contact state, the preheating unit being configured to heat the recording medium so that, when the recording medium that is sent to the transfer unit by the reversing unit and on which the toner image is transferred to a second surface is heated, a temperature of the first surface of the recording medium is higher than a softening point of a toner before the recording medium is heated by the main heating unit; and a non-contact unit that brings a toner image forming region on the first surface of the recording medium on which the toner image is transferred onto the second surface and a member other than the recording medium between the preheating unit and the main heating unit in a non-contact state.

BRIEF DESCRIPTION OF DRAWINGS

Exemplary embodiment(s) of the present invention will be described in detail based on the following figures, wherein:

FIG. 7 is a table showing evaluation results for Comparative Examples and Examples of the image forming device according to the exemplary embodiment;

DETAILED DESCRIPTION

Figure 1:
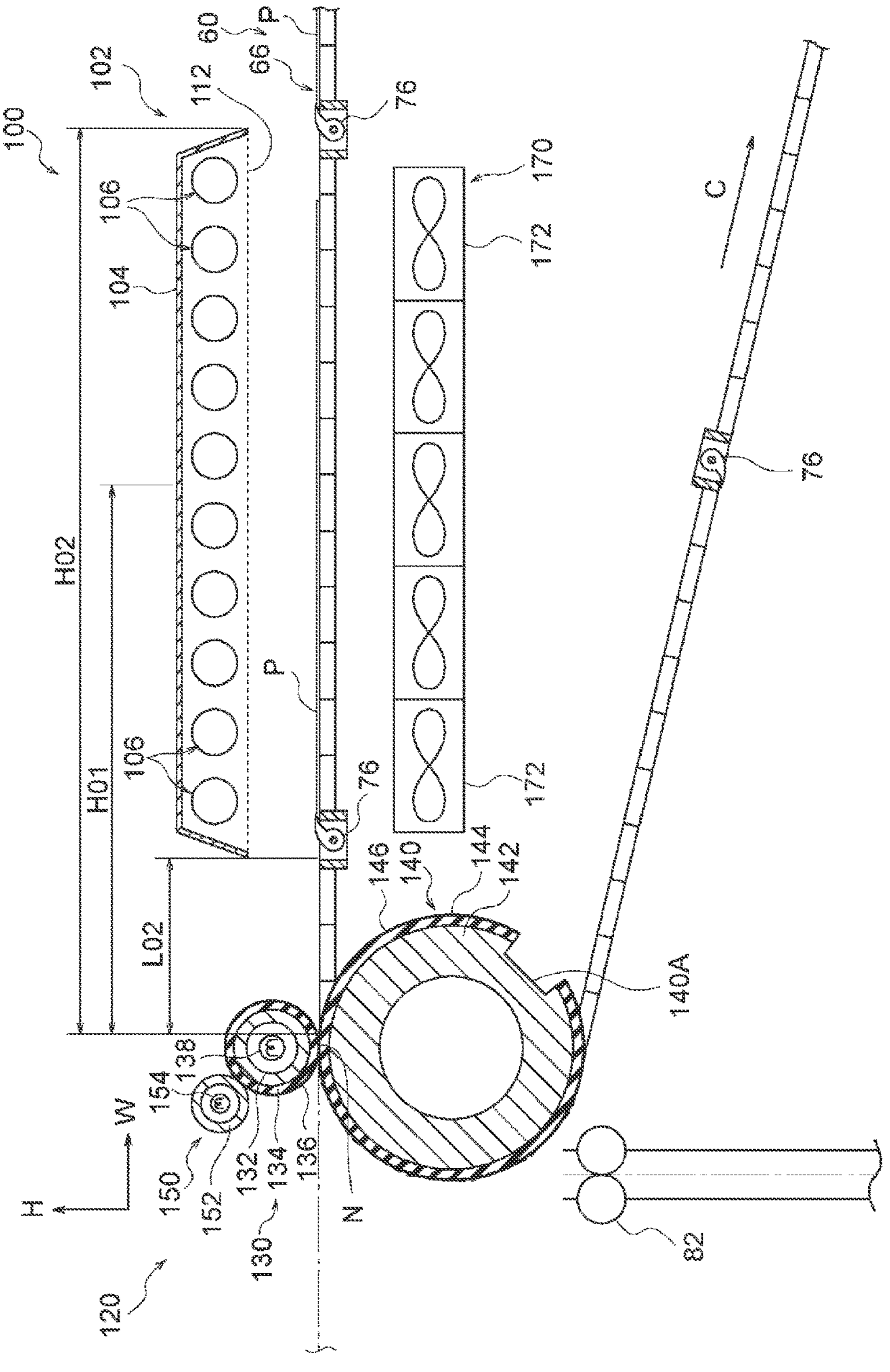
FIG. 1 is a configuration diagram illustrating a fixing device included in the image forming device according to an exemplary embodiment.

An exemplary embodiment of an image forming device will be described with reference to FIGS. 1 to 10. In the drawings, an arrow H indicates an apparatus upper-lower direction (vertical direction), an arrow W indicates an apparatus width direction (horizontal direction), and an arrow D indicates an apparatus depth direction (horizontal direction).

(Image Forming Device 10)

Figure 10:
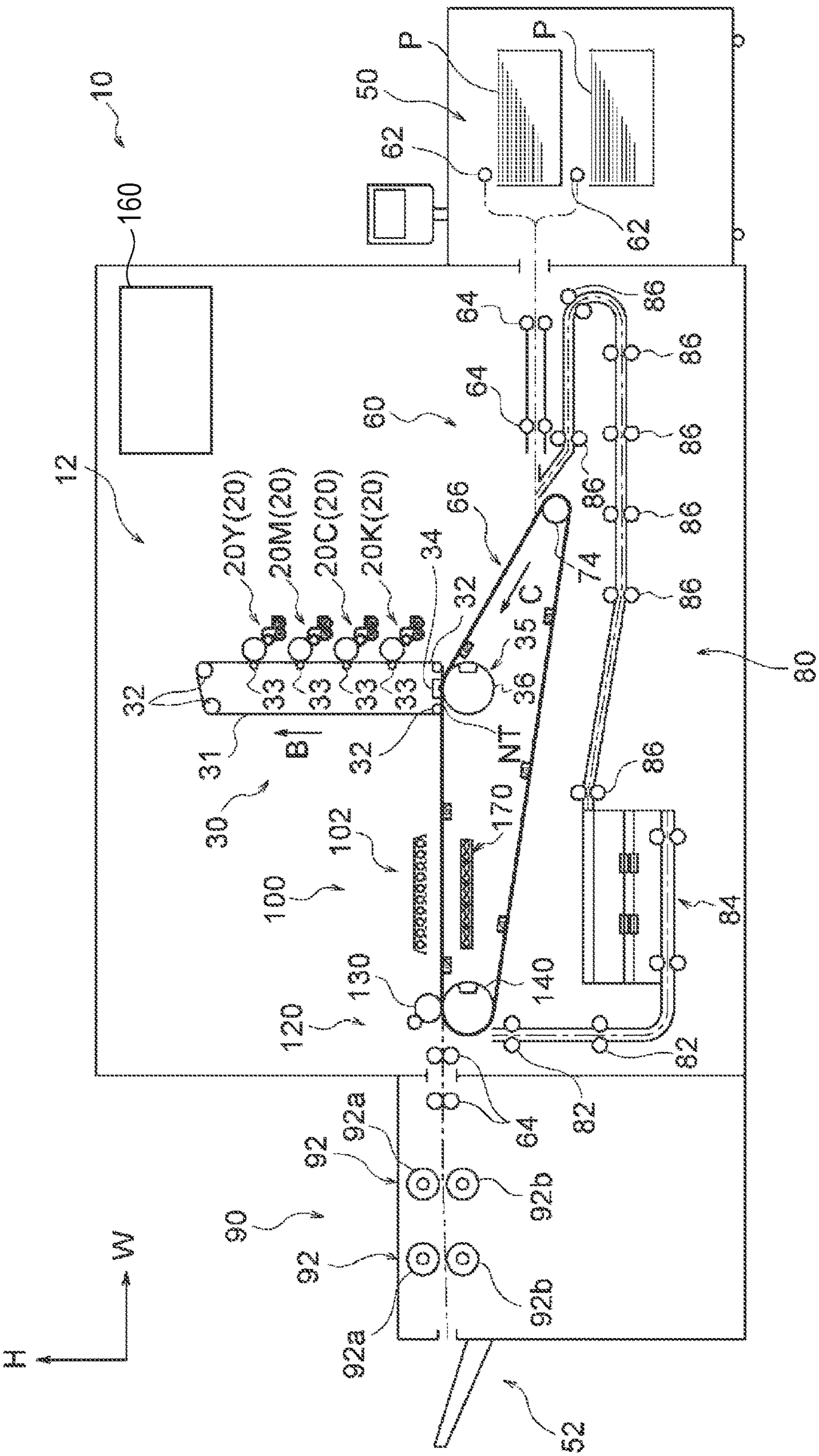
FIG. 10 is a configuration diagram illustrating an image forming device according to the exemplary embodiment.

The image forming device 10 according to the exemplary embodiment is an electrophotographic image forming device that forms a toner image on a sheet member P. As illustrated in FIG. 10, the image forming device 10 includes a control unit 160, an accommodating unit 50, a discharging unit 52, an image forming unit 12, a conveying mechanism 60, a reversing mechanism 80, a fixing device 100, and a cooling unit 90.

[Control Unit 160]

The control unit 160 includes a central processing unit (CPU), a read only memory (ROM), a random access memory (RAM), and a hard disk drive (HDD) (all not illustrated). The CPU executes a processing program. The ROM stores various programs, various tables, parameters, and the like. The RAM is used as a work area or the like when the CPU executes various programs.

[Accommodating Unit 50]

The accommodating unit 50 has a function of accommodating the sheet member P as a recording medium. The image forming device 10 includes plural (for example, two) accommodating units 50. The accommodating unit 50 is configured to selectively send out the sheet member P from the plural accommodating units 50.

[Discharging Unit 52]

The discharging unit 52 is a portion to which the sheet member P on which the toner image is formed is discharged. Specifically, after the toner image is fixed by the fixing device 100, the sheet member P cooled by the cooling unit 90 is discharged to the discharging unit 52.

[Image Forming Unit 12]

The image forming unit 12 has a function of forming a toner image on the sheet member P by an electrophotographic method. Specifically, the image forming unit 12 includes a toner image forming unit 20 that forms a toner image, and a transfer device 30 that transfers the toner image formed by the toner image forming unit 20 to the sheet member P.

The image forming device 10 is provided with plural toner image forming units 20 so as to form a toner image for each color. The image forming device 10 includes the toner image forming units 20 of a total of four colors of yellow (Y), magenta (M), cyan (C), and black (K). (Y), (M), (C), and (K) illustrated in FIG. 10 show constituent portions corresponding to the respective colors.

(Toner Image Forming Unit 20)

Figure 9:
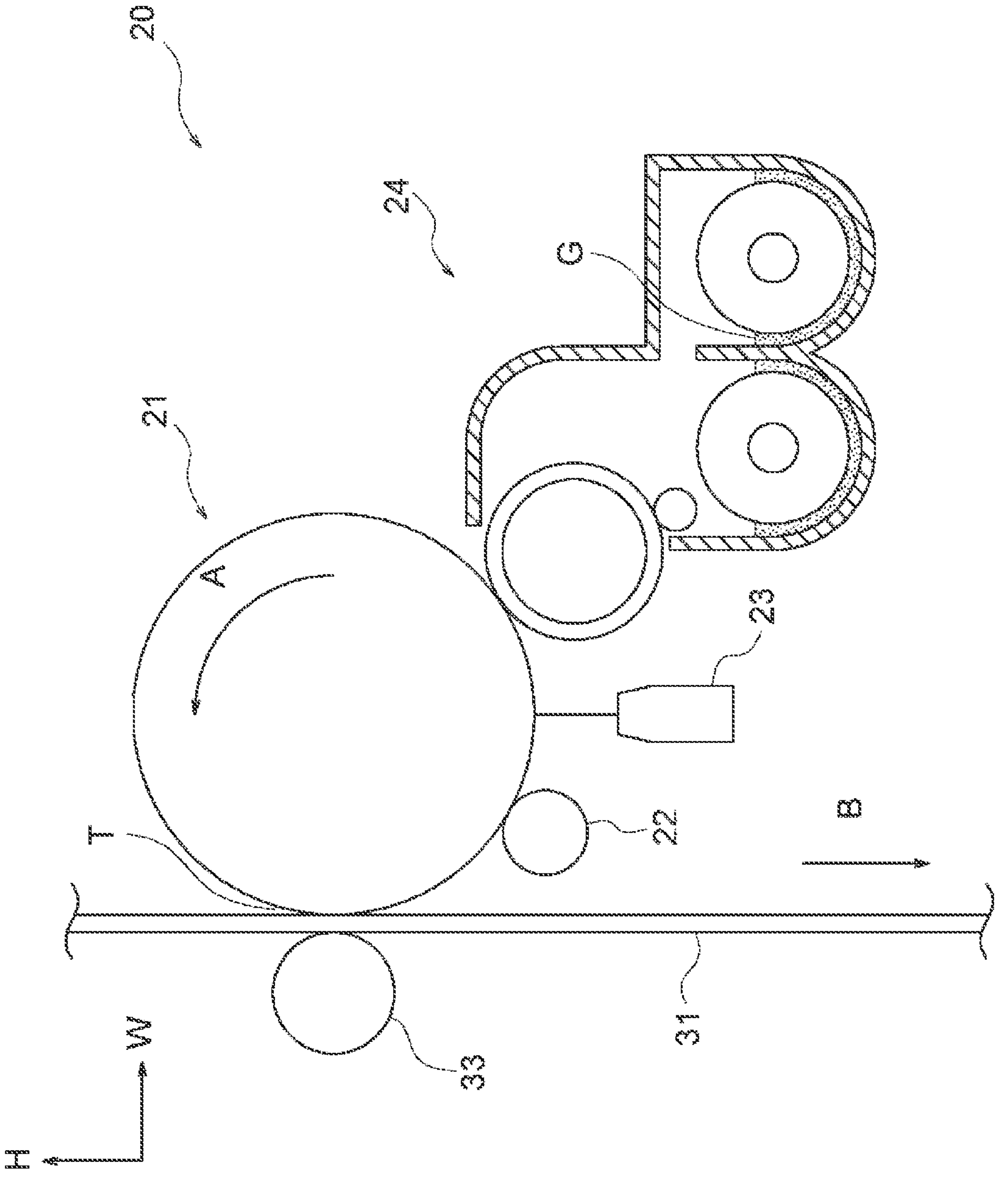
FIG. 9 is a configuration diagram illustrating a toner image forming unit included in the image forming device according to the exemplary embodiment.

The toner image forming units 20 of these colors have basically the configuration except for the toner to be used. Specifically, as illustrated in FIG. 9, the toner image forming unit 20 of each color includes a photosensitive drum 21 (that is, a photoconductor) that rotates in a direction indicated by an arrow A in the drawing, and a charger 22 that charges the photosensitive drum 21. The toner image forming unit 20 of each color includes an exposure device 23 that exposes the photosensitive drum 21 charged by the charger 22 to light to form an electrostatic latent image on the photosensitive drum 21, and a developing device 24 that uses the toner to develop the electrostatic latent image formed on the photosensitive drum 21 by the exposure device 23 to form a toner image.

(Transfer Device 30)

The transfer device 30 has a function of primarily transferring toner images of the photosensitive drums 21 of the respective colors onto an intermediate transfer body in a superimposed manner, and secondarily transferring the superimposed toner images onto the sheet member P. Specifically, as illustrated in FIG. 10, the transfer device 30 includes a transfer belt 31 as an intermediate transfer member, a primary transfer roller 33, and a transfer unit 35.

The primary transfer roller 33 has a function of transferring the toner image formed on the photosensitive drum 21 to the transfer belt 31 at a primary transfer position T (see FIG. 9) between the photosensitive drum 21 and the primary transfer roller 33.

The transfer belt 31 is an endless belt. The transfer belt 31 is wound around plural rollers 32, and the posture of the transfer belt 31 is determined. When at least one of the plural rollers 32 is driven to rotate, the transfer belt 31 circulates in a direction indicated by an arrow B, and the primarily transferred toner image is conveyed to a secondary transfer position NT.

The transfer unit 35 has a function of transferring the toner image transferred to the transfer belt 31 to the sheet member P. Specifically, the transfer unit 35 includes a secondary transfer unit 34 and a facing roller 36.

The facing roller 36 is disposed below the transfer belt 31 so as to face the transfer belt 31. The secondary transfer unit 34 is disposed on an inner side of the transfer belt 31 such that the transfer belt 31 is disposed between the facing roller 36 and the secondary transfer unit 34. The secondary transfer unit 34 is specifically configured by a corotron. In the transfer unit 35, the toner image transferred to the transfer belt 31 is transferred to the sheet member P passing through the secondary transfer position NT by an electrostatic force generated by the discharge of the secondary transfer unit 34.

[Conveying Mechanism 60]

The conveying mechanism 60 has a function of conveying the sheet member P accommodated in the accommodating unit 50 to the secondary transfer position NT. Further, the conveying mechanism 60 has a function of conveying the sheet P from the secondary transfer position NT to the main heating unit 120 to be described later. The conveying mechanism 60 will be described in detail later.

[Reversing Mechanism 80]

The reversing mechanism 80 has a function of reversing the front and back of the sheet member P. The reversing mechanism 80 will be described in detail later.

[Fixing Device 100]

The fixing device 100 has a function of fixing the toner image transferred to the sheet member P by the transfer device 30 to the sheet member P. The fixing device 100 will be described in detail later.

[Cooling Unit 90]

The cooling unit 90 has a function of cooling the sheet member P heated by the fixing device 100. As illustrated in FIG. 10, the cooling unit 90 is disposed on the downstream side of the main heating unit 120 of the fixing device 100 in the conveyance direction of the sheet member P. The cooling unit 90 includes two cooling rollers 92 disposed in the apparatus width direction. Since the two cooling rollers 92 have the same configuration, one of the cooling rollers 92 will be described.

Figure 8:
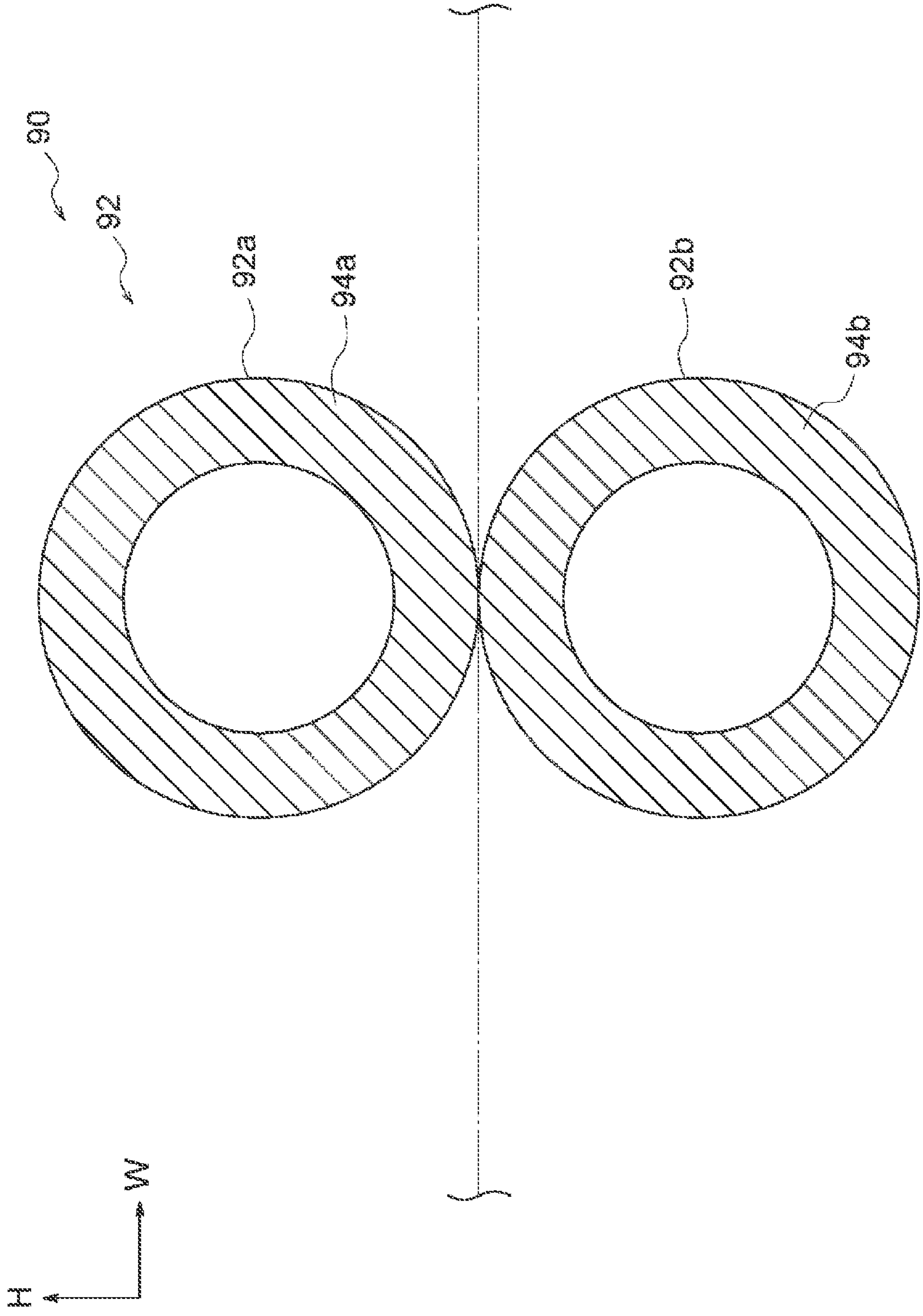
FIG. 8 is a cross-sectional view illustrating a cooling unit included in the image forming device according to the exemplary embodiment.

As illustrated in FIG. 8, the cooling roller 92 includes a roller 92*a* disposed above the sheet member P with the conveyance path therebetween, and a roller 92*b* disposed below the sheet member P with the conveyance path therebetween.

The rollers 92*a*, 92*b* have a cylindrical shape extending in the apparatus depth direction, and have cylindrical base member 94*a*, 94*b*. The base members 94*a*, 94*b* are aluminum pipes, and flow of air generated by a blowing mechanism (not shown) is generated inside the base members 94*a*, 94*b*. Due to the flow of the air, the temperature of the surfaces of the rolls 92*a*, 92*b* decreases as compared with the temperature in the case where the flow of the air does not occur.

In this configuration, the roller 92*b* is rotated by a rotational force from a driving member (not shown). Further, the roller 92*a* is rotated following the roller 92*b*. The rollers 92*a*, 92*b* conveys the sheet member P while nipping the sheet member P therebetween, and cool the sheet member P.

(Operation of Image Forming Device)

In the image forming device 10 shown in FIG. 10, a toner image is formed as follows.

First, the charger 22 (see FIG. 9) of each color to which a voltage is applied uniformly and negatively charges the surface of the photosensitive drum 21 of each color at a predetermined potential. Subsequently, the exposure device 23 irradiates the surface of the charged photosensitive drum 21 of each color with exposure light to form an electrostatic latent image based on the image data input from the outside.

Accordingly, an electrostatic latent image corresponding to the image data is formed on the surface of each photosensitive drum 21. Further, the developing device 40 of each color develops the electrostatic latent image and visualizes the electrostatic latent image as a toner image. The transfer device 30 transfers the toner image formed on the surface of the photosensitive drum 21 of each color to the transfer belt 31.

The sheet member P, which is fed and conveyed from the accommodating unit 50 illustrated in FIG. 10 to the conveyance path of the seat member P by the conveying mechanism 60, is fed to the secondary transfer position NT in which the transfer belt 31 and the facing roller 36 are in contact with each other. At the secondary transfer position NT, the sheet member P is nipped and conveyed by the transfer belt 31 and the facing roller 36, so that the toner image on the front surface of the transfer belt 31 is transferred to the first surface (=front surface) of the sheet member P.

Further, the fixing device 100 fixes the toner image transferred on the first surface of the sheet member P to the sheet member P, and the sheet member P is conveyed to the cooling unit 90. The cooling unit 90 cools the sheet member P to which the toner image is fixed and discharges the sheet member P to the discharging unit 52.

On the other hand, when a toner image is formed on the second surface (=back surface) of the sheet member P, the sheet member P that has passed through the fixing device 100 by being conveyed by the conveying mechanism 60 is conveyed to the reversing mechanism 80, and the front and back of the sheet member P are reversed by the reversing mechanism 80. Further, the reversing mechanism 80 conveys the sheet member P whose front and back are reversed to the conveying mechanism 60. The conveying mechanism 60 conveys the sheet member P. Then, in order to form a toner image on the second surface of the sheet member P, the above-described steps are performed again.

(Configuration of Main Parts)

Next, the conveying mechanism 60, the reversing mechanism 80, and the fixing device 100 will be described.

[Conveying Mechanism 60]

As illustrated in FIG. 10, the conveying mechanism 60 includes a feeding roller 62, plural conveying rollers 64, and a chain gripper 66. The chain gripper 66 is an example of a conveyance unit.

The feeding roller 62 is a roller that feeds out the sheet member P accommodated in the accommodating unit 50. The plural conveying rollers 64 are rollers that convey the sheet member P fed by the feeding rollers 62 to the chain gripper 66 or rollers that convey the sheet member P conveyed by the chain gripper 66 to the cooling unit 90. The chain gripper 66 has a function of holding the leading end portion of the sheet member P and conveying the sheet member P.

Figure 2:
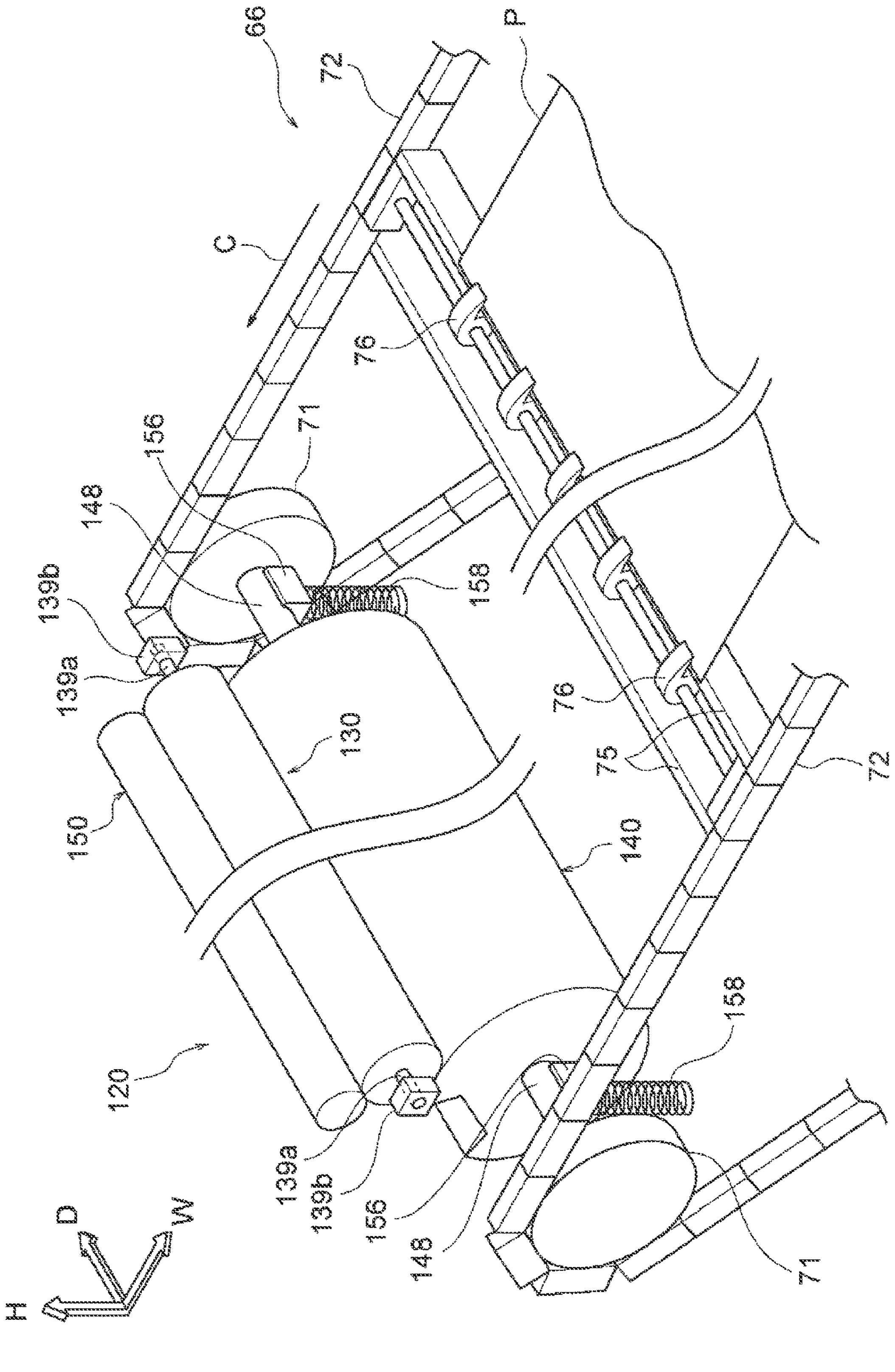
FIG. 2 is a perspective view illustrating a main fixing unit of the fixing device included in the image forming device according to the exemplary embodiment.
Figure 3:
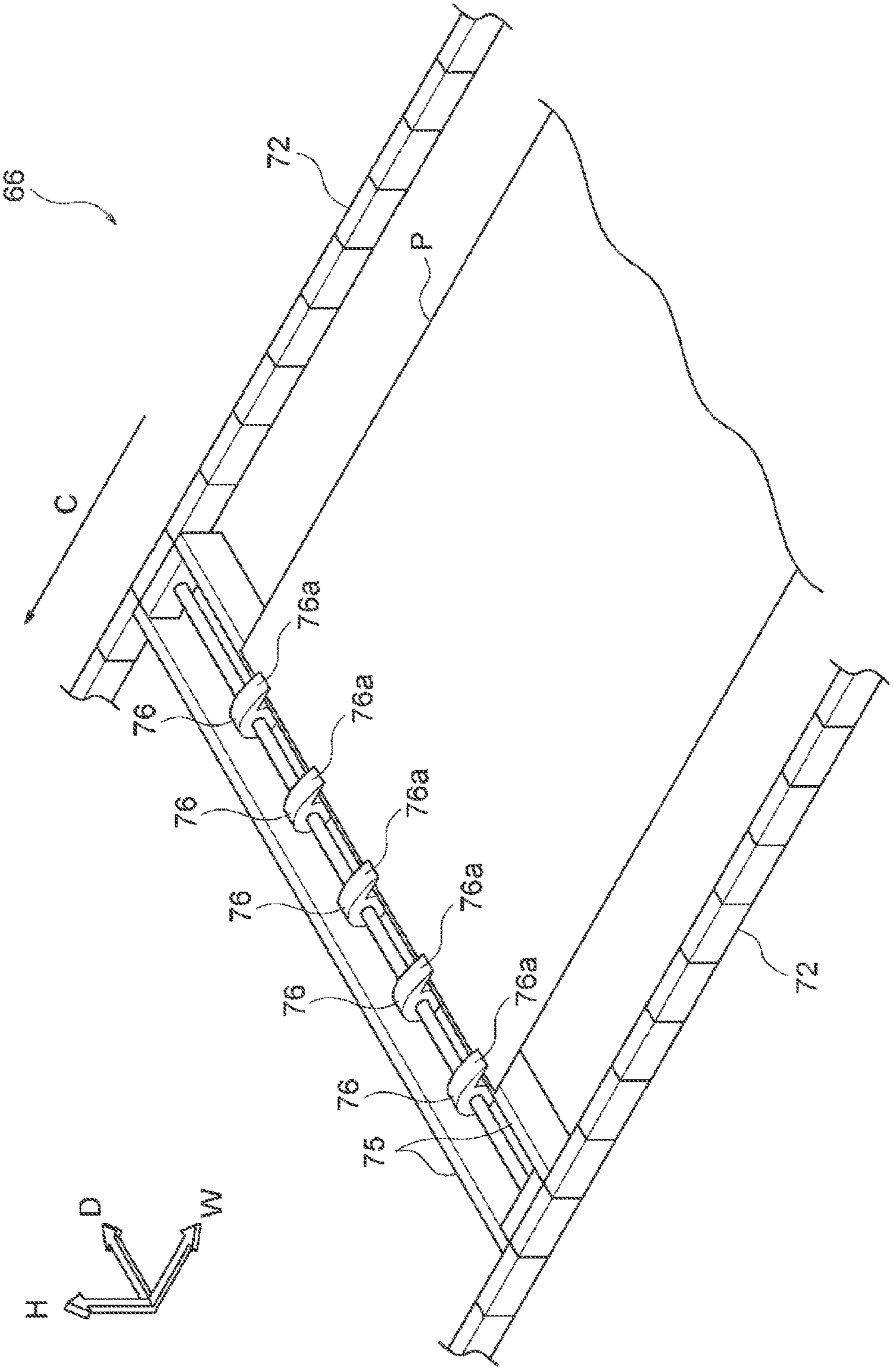
FIG. 3 is a perspective view illustrating a chain gripper of the image forming device according to the exemplary embodiment.

As shown in FIG. 3, the chain gripper 66 includes a pair of chains 72 and a gripper 76 as a holding portion (=gripping portion). The pair of chains 72 is formed in an annular shape. The pair of chains 72 is disposed at intervals in the apparatus depth direction. The pair of chains 72 is wound around a pair of sprockets (not illustrated) disposed on one end side and the other end side in the axial direction with respect to the facing roller 36 (see FIG. 10), and a pair of sprockets 71 (see FIG. 2) disposed on one end side and the other end side in the axial direction with respect to a pressing roller 140 described later. Further, the pair of chains 72 is wound around a pair of sprockets 74 (see FIG. 10). When one of the pair of sprockets rotates, the chains 72 circulate in a direction indicated by an arrow C.

Plural attachment members 75 to which plural grippers 76 are attached are stretched over the pair of chains 72 along the apparatus depth direction. The plural attachment members 75 are fixed to the pair of chains 72 at predetermined intervals along the peripheral direction (circulation direction) of the chains 72.

The plural grippers 76 are attached to the attachment member 75 at predetermined intervals along the apparatus depth direction. The gripper 76 has a function of holding the leading end portion of the sheet member P. Specifically, the gripper 76 has a claw 76*a*. A contact portion 75*a* (see FIG. 6) with which the claw 76*a* comes into contact is formed in the attachment member 75.

The gripper 76 holds the sheet member P by sandwiching the leading end portion of the sheet member P between the claw 76*a* and the contact portion 75*a*. In the gripper 76, for example, the claw 76*a* is pressed against the contact portion 75*a* by a spring or the like, and the claw 76*a* is brought into contact with and separated from the contact portion 75*a* by the action of a cam or the like.

In the chain gripper 66, the chain 72 circulates in the direction indicated by an arrow C in a state in which the gripper 76 holds the leading end portion of the sheet member P, so that the sheet member P is conveyed. The chain gripper 66 conveys the sheet member P conveyed by the plural conveying rollers 64 to the secondary transfer position NT, passes the sheet member P through a preheating unit 102 described later, and then conveys the sheet member P to a main heating unit 120 described later. In the conveying mechanism 60, a part of the conveyance path through which the sheet member P is conveyed is indicated by an alternate long and short dash line in FIG. 10.

In this configuration, the chain gripper 66 conveys the sheet member P along the horizontal direction at least from the secondary transfer position NT to the main heating unit 120. That is, the chain gripper 66 conveys the sheet member P such that the unfixed toner image surface faces upward at least from the secondary transfer position NT to the main heating part 120.

[Reversing Mechanism 80]

As illustrated in FIG. 10, the reversing mechanism 80 includes plural conveying rollers 82, a reversing device 84, and plural conveying rollers 86. The reversing mechanism 80 is an example of a reversing unit.

The plural conveying rollers 82 are rollers that convey the sheet member P fed from the fixing device 100 to the reversing device 84. As an example, the reversing device 84 is a device that twists the seat member P like a Mobius strip to reverse the front and back of the sheet member P by conveying the sheet member P while folding the sheet member P plural times such that the conveyance direction of the sheet member P is changed by, for example, 90 degrees. The plural conveying rollers 86 are rollers that convey the sheet member P, whose front and back are reversed by the reversing device 84, to the chain gripper 66.

In this configuration, when a toner image is formed on the first surface (i.e., the front surface) and the second surface (i.e., the back surface) of the sheet member P (hereinafter, referred to as "double-sided printing"), the reversing mechanism 80 reverses the front and back of the sheet member P in which the toner image is fixed on the first surface (i.e., the front surface). Then, the reversing mechanism 80 sends the sheet member P to the secondary transfer position NT through the chain gripper 66.

[Fixing Device 100]

As illustrated in FIG. 1, the fixing device 100 includes a preheating unit 102 that heats the sheet member P in a non-contact state with the conveyed sheet member P, a main heating unit 120 that heats and presses the sheet member P in contact with the sheet member P, and a blowing unit 170.

[Preheating Unit 102]

As illustrated in FIG. 1, the preheating unit 102 is disposed on the downstream side of the secondary transfer position NT (see FIG. 10) at which the toner image is transferred to the sheet member P in the conveyance direction of the sheet member P, and is disposed above the conveyed sheet member P. In other words, the preheating unit 102 is disposed on the unfixed toner image side transferred to the sheet member P. The preheating unit 102 includes a reflecting plate 104, plural infrared heaters 106 (hereinafter, referred to as "heaters 106"), and a wire mesh 112.

(Reflecting Plate 104)

The reflecting plate 104 is formed of an aluminum plate, and is formed in a bottomed box shape opened on a side of the conveyed sheet member P. In the exemplary embodiment, when viewed from above, the reflecting plate 104 covers the conveyed sheet member P in the apparatus depth direction.

(Heater 106)

The heater 106 is an infrared heater having a cylindrical outer shape, and is disposed so as to be accommodated inside the reflecting plate 104 and to extend in the apparatus depth direction. In the present exemplary embodiment, when viewed from above, the heater 106 covers the conveyed sheet member P in the apparatus depth direction. Further, the heater 106 is separated by 30 mm in the upper-lower direction from the conveyed sheet member P.

The plural heaters 106 are disposed in the apparatus width direction. In the present exemplary embodiment, when viewed from above, the region where the plural heaters 106 are disposed covers the conveyed sheet member P in the apparatus width direction. In other words, the plural heaters 106 heat the entire conveyed sheet members P at a time.

In the above configuration, infrared rays having a maximum spectral radiance at a wavelength of 3 μm or more and 5 μm or less are radiated from the heater 106, and the surface temperature of the heater 106 becomes a predetermined temperature of 300° C. or more and 1175° C. or less.

(Wire Mesh 112)

The wire mesh 112 is fixed to an edge portion of the reflecting plate 104 by a fixing member (not shown), and partitions the inside of the reflecting plate 104 and the outside of the reflecting plate 104 from each other. Thus, the wire mesh 112 prevents the conveyed sheet member P from coming into contact with the heater 106.

In this configuration, the preheating unit 102 heats the sheet member P in a non-contact state from an unfixed toner image side. That is, the preheating unit 102 functions as a softening means for softening an unfixed toner.

When a toner image is formed only on the first surface (that is, the front surface) (hereinafter may be referred to as "single-sided printing"), the preheating unit 102 heats the sheet member P in a non-contact state from the first surface side facing upward. Specifically, the preheating unit 102 heats the sheet member P such that the temperature of the first surface of the sheet member P before the sheet member P is heated by the main heating unit 120 becomes higher than the softening point of the toner. In other words, the preheating unit 102 heats the sheet member P such that the temperature of the first surface of the sheet member P before the sheet member P is heated by the main heating unit 120 is maintained higher than the softening point of the toner.

In the case of double-sided printing, when the toner image formed on the second surface (that is, the back surface) is heated, the preheating unit 102 heats the sheet member P in a non-contact state from the second surface side facing upward. Specifically, the preheating unit 102 heats the sheet member P such that the temperature of the second surface of the sheet member P before the sheet member P is heated by the main heating unit 120 becomes higher than the softening point of the toner. Further, the preheating unit 102 heats the sheet member P such that the temperature of the first surface of the sheet member P before the sheet member P is heated by the main heating unit 120 becomes higher than the softening point of the toner. In other words, the preheating unit 102 heats the sheet member P such that the temperature of the first surface of the sheet member P before the sheet member P is heated by the main heating unit 120 is maintained higher than the softening point of the toner. In the present exemplary embodiment, as an example, an output condition of the preheating unit 102 under which the temperature of the first surface of the sheet member P is higher than the softening point of the toner is obtained in advance for each paper type or paper size by a test, and an output table of the preheating unit 102 is stored in the control unit 160. Then, the control unit 160 adjusts the output of the preheating unit 102 based on the information on the sheet type or size of the sheet member P input by the user. Thus, the preheating unit 102 heats the sheet member P such that the temperature of the first surface of the sheet member P is higher than the softening point of the toner. The temperature of the first surface may be measured by a temperature sensor, and the control unit 160 may adjust the output of the preheating unit 102 based on a measurement result, thereby heating the sheet member P such that the temperature of the first surface of the sheet member P is lower than the softening point of the toner.

That is, since the preheating unit 102 heats the sheet member P such that the temperature of the first surface of the sheet member P before the sheet member P is heated by the main heating unit 120 is higher than the softening point of the toner, the temperature of the second surface on which the unfixed toner image is formed is higher than the softening point of the toner.

As described above, the preheating unit 102 functions as another softening means that softens the toner constituting the toner image of the first surface that has already been fixed to the sheet member P.

Figure 5:
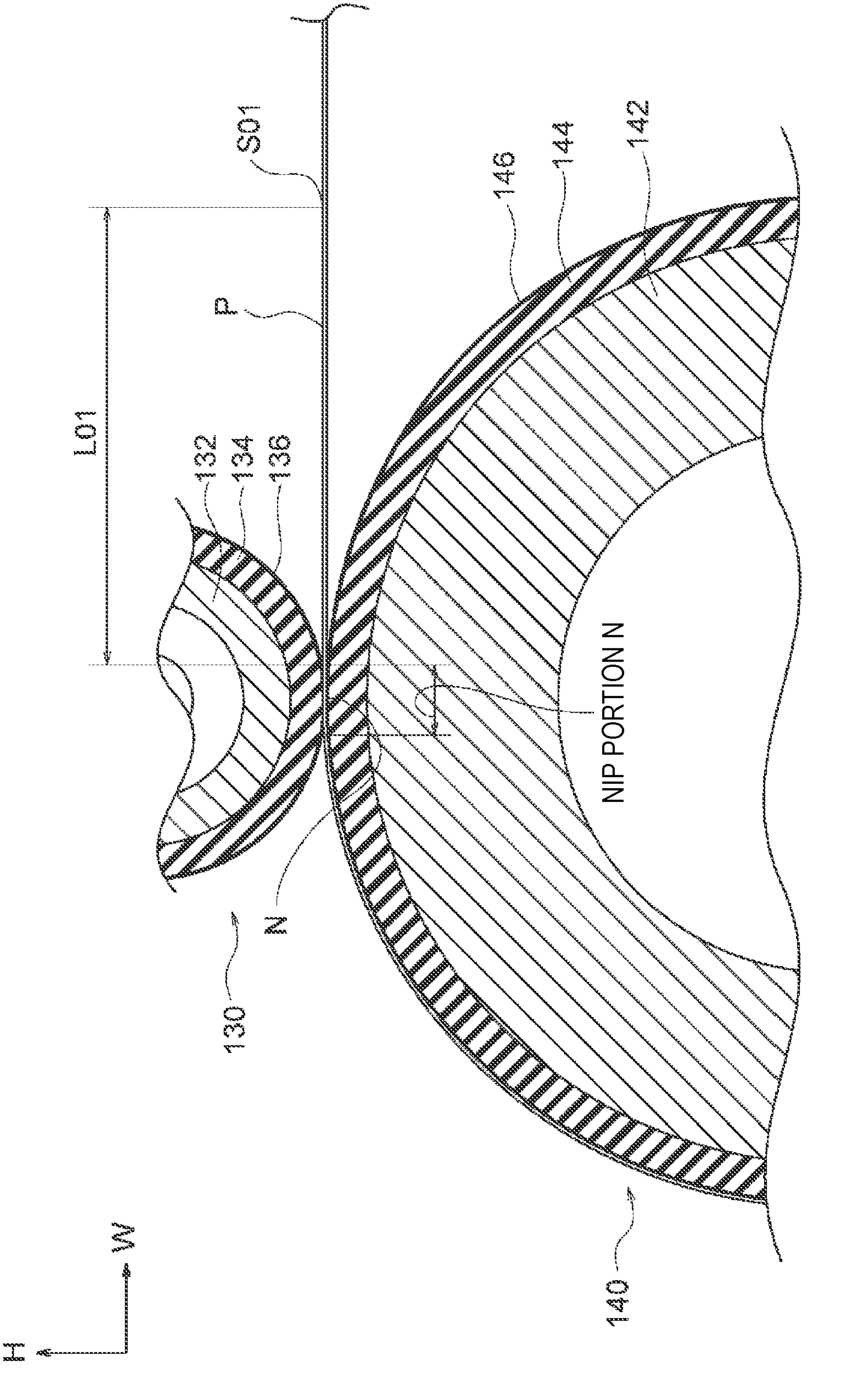
FIG. 5 is a cross-sectional view illustrating a main fixing unit of the fixing device included in the image forming device according to the exemplary embodiment.

Here, "the temperature of the first surface or the second surface of the sheet member P before the sheet member P is heated by the main heating unit 120" is the temperature of the first surface or the second surface of the sheet member P at a position S01 which is 100 mm (L01 illustrated in FIG. 5) from the upstream end in the conveyance direction to the upstream side in the conveyance direction of the nip portion N of the main heating unit 120 illustrated in FIG. 5.

On the other hand, in the case of the double-sided printing, when heating the toner image transferred to the second surface so as to face the second surface, the preheating unit 102 heats the sheet member P such that the temperature of the first surface at the position S01 is higher than the softening point of the toner. Specifically, regardless of the image density and color of the toner image transferred to the second surface, the output of the preheating unit 102 is adjusted such that the temperature of the first surface at the position S01 is higher than the softening point of the toner.

In the exemplary embodiment, as an example, the output of the preheating unit 102 is adjusted from the paper type, the size, the image distribution, and the like of the sheet member P input by the user. Thus, in the case of double-sided printing, the preheating unit 102 heats the sheet member P such that the temperature of the first surface of the sheet member P is higher than the softening point of the toner.

Here, "the softening point of the toner (=the glass transition temperature of the toner)" is a ½ descent rate measured under the conditions of a die pore diameter of 0.5 mm, a pressure load of 0.98 MPa, and a temperature increase rate of 1° C./min using a flow tester (CFT 500, manufactured by Shimadzu Corporation). The ½ descent rate is a temperature corresponding to ½ of the height obtained from an outflow start point to the end point when a toner sample is melted and flowed out. In the exemplary embodiment, as an example, a toner having a softening point of 75° C. is used.

[Blowing Unit 170]

Figure 4:
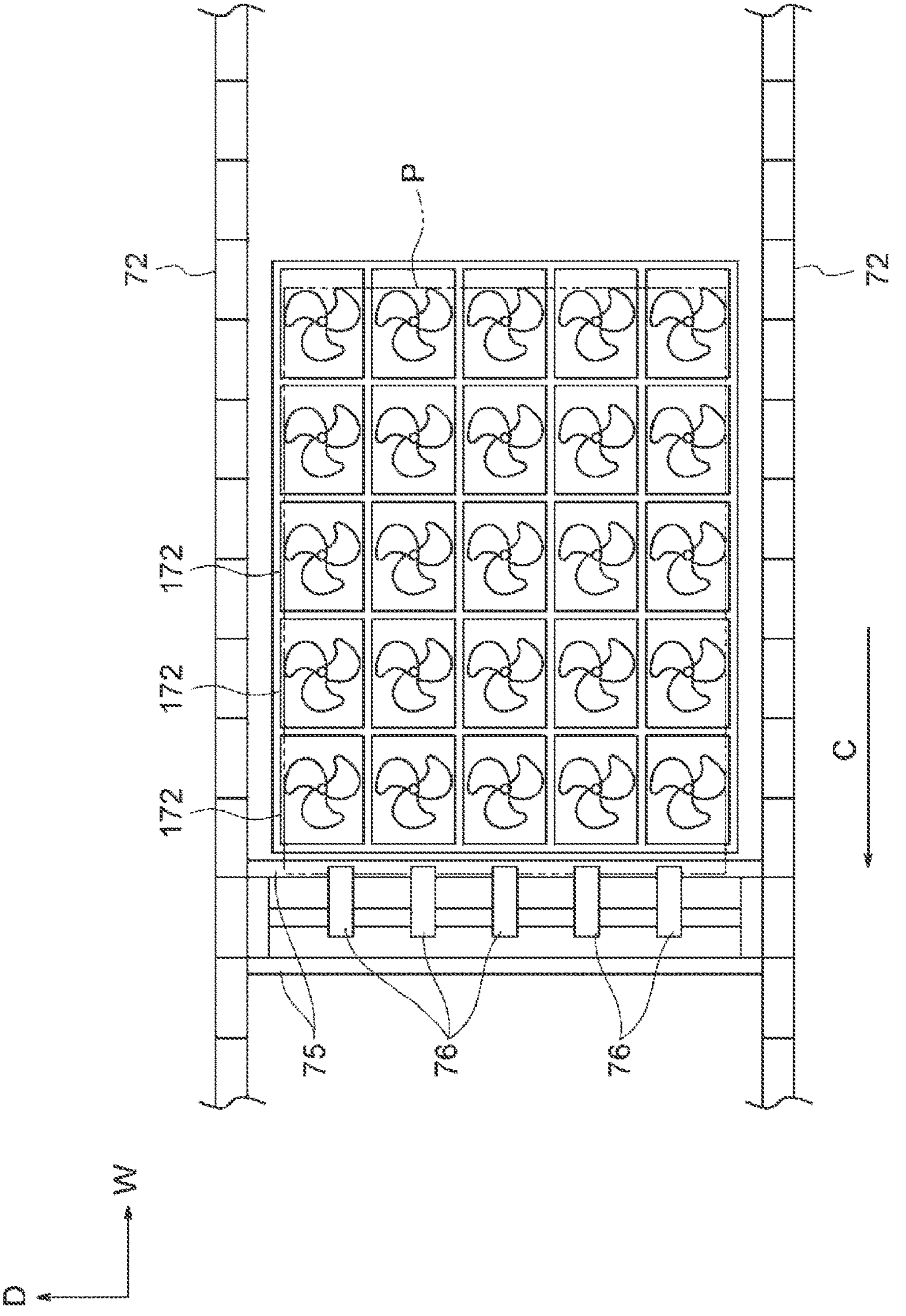
FIG. 4 is a plan view illustrating a fan included in the image forming device according to the exemplary embodiment.

As shown in FIG. 1, the blowing unit 170 is disposed so as to face the preheating unit 102 in the upper-lower direction, and the conveyed sheet member P passes between the blowing unit 170 and the preheating unit 102. Further, as illustrated in FIG. 4, the blowing unit 170 includes plural fans 172 arranged in the apparatus width direction and the apparatus depth direction. The fan 172 is an example of a blowing unit.

In this configuration, by blowing air toward the sheet member P passing between the plural fans 172 and the preheating unit 102, the conveyance posture of the sheet member P conveyed with the leading end portion thereof being held is stabilized. Specifically, by blowing air toward the sheet member P by the plural fans 172, the conveyance posture of the sheet member P is stabilized between the preheating unit 102 and the main heating unit 120. In this way, the fan 172 functions as a posture stabilizing means for stabilizing the conveyance posture of the sheet member P.

Here, the expression "the conveyance posture of the sheet member P is stabilized" means that a distance from a rear end portion of the sheet member in a state of being bent by gravity to the preheating unit 102 is smaller than when the posture stabilizing means is not provided. That is, "the conveyance posture of the sheet member P is stabilized" means that a distance in the vertical direction from the sheet surface of the sheet member P to the preheating unit 102 is smaller than that in the case where the sheet member P is bent by gravity. Further, the distance from the sheet surface of the sheet member P to the preheating unit 102 may be longer than the distance from the preheating unit 102 to the gripper 76, and the difference between the longest distance from the sheet surface of the sheet member P to the preheating unit 102 and the shortest distance may be reduced. Here, the output of the fan 172 may be adjusted. In the present exemplary embodiment, as an example, the output condition of the fan 172 is obtained for each paper type or paper size, and the output table of the fan 172 is stored in the control unit 160. Then, the control unit 160 adjusts the output of the fan 172 based on the information on the paper type or the size of the sheet member P input by the user. For example, when the paper thickness input by the user is larger than the predetermined value or when the size of the paper input by the user is larger than the predetermined value, the control unit 160 increases the output of the fan. The distance from the sheet surface of the sheet member P to the preheating unit 102 may be measured by an optical sensor, and the control unit 160 may adjust the output of the fan 172 based on the measurement result.

By blowing air to the sheet member P by the fans 172, the rear end of the sheet member P is prevented from moving away from the conveyance path as compared with the case where air is not blown to the sheet member P. In this way, the fan 172 functions as a position regulating means for regulating the position of the rear end of the sheet member P.

Since the fan 172 regulates the position of the rear end of the sheet member P, the image forming region of the surface facing downward in the sheet member P and a member other than the sheet member P are in a non-contact state between the preheating unit 102 and the main heating unit 120. In this way, the fan 172 functions as a non-contact means for bringing the image forming region on the surface facing downward on the sheet member P into a non-contact state with a member other than the sheet member P.

Here, the expression "between the preheating unit 102 and the main heating unit 120" means that the toner image in a state in which the toner is soft is between the central portion of the preheating unit 102 in the conveyance direction of the sheet member P and a nip portion N of the main heating unit 120 described below (=H01 in FIG. 1), from the viewpoint of suppressing damage due to contact with the member other than the sheet member P. The "distance from the preheating unit 102 to the main heating unit 120" may be between the upstream end of the preheating unit 102 in the conveyance direction of the sheet member P and the nip portion N of the main heating unit 120 described later (that is, a range H02 in FIG. 1).

The expression "the image forming region and the member other than the sheet member P are not in contact with each other" means a state in which the image forming region of the sheet member P is not in contact with any member.

The "image forming region" refers to a portion other than a portion where an image such as an outer peripheral portion of the sheet member P is not formed, and is a region in which an image is formed when a full-surface solid image is formed on the sheet member P. In the present exemplary embodiment, in the sheet member P, all portions other than the leading end portion gripped by the gripper 76 are in a non-contact state with the member other than the sheet member P.

[Main Heating Unit 120]

As illustrated in FIG. 1, the main heating unit 120 is disposed on the downstream side of the preheating unit 102 in the conveyance direction of the sheet member P. The main heating unit 120 includes a heating roller 130 that comes into contact with the conveyed sheet member P to heat the sheet member P, a pressing roller 140 that presses the sheet member P toward the heating roller 130, and a driven roller 150 that is driven to rotate by the rotating heating roller 130.

(Heating Roller 130)

As illustrated in FIG. 1, the heating roller 130 is disposed so as to come into contact with a surface of the conveyed sheet member P facing upward and extend in the apparatus depth direction with the axial direction thereof as the apparatus depth direction. The heating roller 130 includes a cylindrical base member 132, a rubber layer 134 formed so as to cover the entire periphery of the base member 132, a release layer 136 formed so as to cover the entire periphery of the rubber layer 134, and a heater 138 accommodated inside the base member 132. The outer diameter of the outer peripheral surface of the release layer 136 in the heating roller 130 is, for example, 80 mm.

The base member 132 is an aluminum tube, and has a thickness of 20 mm as an example. The rubber layer 134 is formed of silicone rubber, and has a thickness of 6 mm as an example. The release layer 136 is formed of a copolymer of tetrafluoroethylene and perfluoroethylene (PFA resin), and has a thickness of 50 μm as an example.

Further, as shown in FIG. 2, shaft portions 139*a* extending in the apparatus depth direction are formed at both end portions of the heating roller 130 in the apparatus depth direction, respectively, and support members 139*b* supporting the shaft portions 139*a* are provided. Accordingly, the heating roller 130 is rotatably supported by the support members 139*b* at both end portions of the heating roller 130.

(Driven Roller 150)

As illustrated in FIGS. 1 and 2, the driven roller 150 is disposed so as to extend in the apparatus depth direction with the axial direction as the apparatus depth direction on the opposite side of the conveyed sheet member P with the heating roller 130 sandwiched therebetween. The driven roller 150 includes a cylindrical base member 152 and a heater 154 accommodated inside the base member 152. The outer diameter of the outer circumferential surface of the base member 152 of the driven roller 150 is, for example, 50 mm.

The base member 152 is an aluminum tube and has a thickness of 10 mm as an example. The driven roller 150 is rotatably supported by support members (not shown) at both end portions of the driven roller 150.

In the configuration, the driven roller 150 is rotated following the heating roller 130. The driven roller 150 then heats the heating roller 130. In this way, the heating roller 130 is heated by the driven roller 150 and the heating roller 130 itself includes a heater 138, and thus a surface temperature of the heating roller 130 becomes a predetermined temperature of 180° C. or more and 200° C. or less.

(Pressing Roller 140)

As illustrated in FIGS. 1 and 2, the pressing roller 140 is disposed so as to come into contact with a surface of the conveyed sheet member P facing downward on the opposite side of the heating roller 130 with respect to the conveyed sheet member P, and to extend in the apparatus depth direction with the axial direction as the apparatus depth direction. The pressing roller 140 includes a cylindrical base member 142, a rubber layer 144 formed so as to cover the base member 142, a release layer 146 formed so as to cover the rubber layer 144, and a pair of shaft portions 148 (see FIG. 2) formed at both end portions in the apparatus depth direction. The outer diameter of the outer circumferential surface of the release layer 146 in the pressing roller 140 is 225 mm, for example. In this way, the outer diameter of the pressing roller 140 is larger than the outer diameter of the heating roller.

The base member 142 is an aluminum tube and has a thickness of 20 mm as an example. The rubber layer 144 is formed of silicone rubber, and has a thickness of 1 mm as an example. The release layer 146 is formed of a copolymer of tetrafluoroethylene and perfluoroethylene (PFA resin), and has a thickness of 50 μm as an example.

Figure 6:
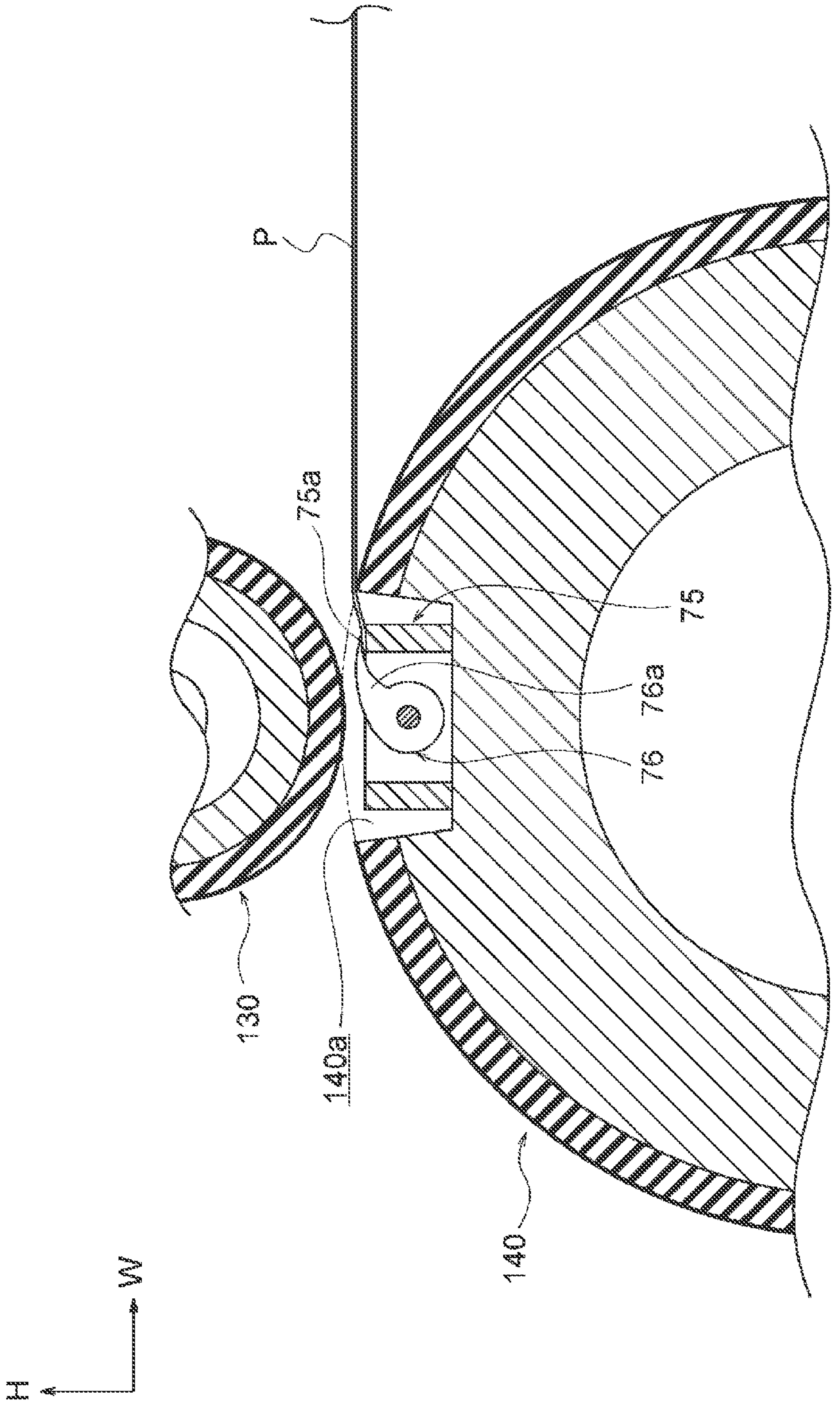
FIG. 6 is a cross-sectional view illustrating a main fixing unit of the fixing device included in the image forming device according to the exemplary embodiment.

A recess 140*a* that extends in the apparatus depth direction is formed on the outer peripheral surface of the pressing roller 140. When the sheet member P passes between the pressing roller 140 and the heating roller 130, a gripper 76 that grips the leading end portion of the sheet member P is accommodated in the recess 140*a* as illustrated in FIG. 6.

The distance (L02 in FIG. 1) from the preheating unit 102 to the main heating unit 120 is determined such that when the sheet member P having the minimum size is used in the conveyance direction of the sheet member P, the rear end of the sheet member P is heated by the preheating unit 102 in a state where the main heating unit 120 heats the leading end of the sheet member P. In other words, in a state in which the leading end of the sheet member P is sandwiched between the nip portions N of the main heating unit 120, the rear end of the sheet member P faces the preheating unit 102 in the upper-lower direction. The minimum size is described in the handling manual of the image forming device 10. The leading end of the sheet member P is an example of a part of the sheet member P, and the rear end of the sheet member P is an example of another portion of the sheet member P.

As illustrated in FIG. 2, a pair of left and right shaft portions 148 are formed at both end portions of the pressing roller 140 in the apparatus depth direction. The pair of shaft portions 148 has a smaller diameter than the outer circumferential surface of the release layer 146 of the pressing roller 140, and extends in the axial direction.

In the configuration, the pressing roller 140 is rotated by a rotational force transmitted from a driving member (not shown). The heating roller 130 rotates following the rotating pressing roller 140, and the driven roller 150 rotates following the rotating heating roller 130. Further, the heating roller 130 and the pressing roller 140 nip and convey the sheet member P to which the toner image is transferred, so that the toner image is fixed to the sheet member P.

(Others)

As illustrated in FIG. 2, the main heating unit 120 includes a pair of support members 156 that supports the pressing roller 140, and a pair of biasing members 158 that biases the pressing roller 140 toward the heating roller 130 via the support member 156.

The pair of support members 156 is disposed so as to rotatably support the pair of shaft portions 148 of the pressing roller 140 from below.

The pair of biasing members 158 is a compression spring and is disposed on the opposite side of the shaft portion 148 with the support member 156 interposed therebetween.

In the configuration, the pair of biasing members 158 biases the pressing roller 140 toward the heating roller 130, and thus the pressing roller 140 presses the sheet member P toward the heating roller 130. Then, as shown in FIG. 2, the heating roller 130 in the portion biased by the pressing roller 140 is deformed, and a nip portion N that is a region where the heating roller 130 and the pressing roller 140 are in contact with each other is formed.

When the sheet member P is nipped at the nip portion N between the heating roller 130 and the pressing roller 140, the smoothness of the surface of the toner image formed of the softened toner increases, and the glossiness of the toner image increases. Thus, the main heating unit 120 functions as a glossiness improving means that increases the glossiness of the toner image.

(Operation of Configuration of Main Part)

Next, the operation of the image forming device 10 will be described.

In the image forming device 10 illustrated in FIG. 10, the feeding roller 62 feeds the sheet member P accommodated in the accommodating unit 50 to the conveyance path of the sheet member P. Further, the plural conveying rollers 64 convey the sheet member P fed by the feeding roller 62 to the chain gripper 66.

Further, as shown in FIG. 3, the chain gripper 66 holds the leading end portion of the sheet member P and conveys the sheet member P, and the sheet member P is conveyed to the secondary transfer position NT. At the secondary transfer position NT shown in FIG. 10, the transfer belt 31 and the facing roller 36 nip and convey the sheet member P. Thus, the toner image on the surface of the transfer belt 31 is transferred to the first surface (i.e., the front surface) of the sheet member P facing upward.

The chain gripper 66 further conveys the sheet member P in the horizontal direction. The preheating unit 102 illustrated in FIG. 1 heats the sheet member P in a non-contact state from the first surface side (that is, the unfixed toner image side) of the sheet member P conveyed by the chain gripper 66. When the preheating unit 102 heats the sheet member P, the fans 172 blow air toward the second surface (i.e., the back surface) of the sheet member P. As a result, the conveyance posture of the sheet member P in a state of being heated by the preheating unit 102 is stabilized.

Further, the main heating unit 120 nips and conveys the sheet member P by the heating roller 130 and the pressing roller 140, so that the toner image is fixed to the first surface of the sheet member P.

In the case of single-sided printing, the cooling unit 90 receives the sheet member P from the main heating unit 120, cools the sheet member P to which the toner image is fixed on the first surface, and discharges the sheet member P to the discharging unit 52.

On the other hand, in the case of double-sided printing, the reversing mechanism 80 illustrated in FIG. 10 receives the sheet member P to which the toner image is fixed on the first surface from the main heating unit 120 and reverses the front and back of the sheet member P. Further, the chain gripper 66 receives and conveys the sheet member P whose front and back are reversed from the reversing mechanism 80.

The chain gripper 66 holds and conveys the leading end portion of the sheet member P in a state in which the second surface faces upward, and conveys the sheet member P again to the secondary transfer position NT. At the secondary transfer position NT, the transfer belt 31 and the facing roller 36 nip and convey the sheet member P. Thus, the toner image on the surface of the transfer belt 31 is transferred to the second surface (=back surface) of the sheet member P.

The chain gripper 66 conveys the sheet member P in a state in which the second surface on which the toner image is transferred faces upward and the first surface on which the toner image is fixed faces downward. The preheating unit 102 illustrated in FIG. 1 heats the sheet member P in a non-contact state from the second surface side of the sheet member P conveyed by the chain gripper 66. When the preheating unit 102 heats the sheet member P, the fans 172 of the blowing unit 170 blow air toward the first surface of the sheet member P (that is, the surface facing downward). The posture of the sheet member P heated by the preheating unit 102 is stabilized.

Thus, the sheet member P is conveyed between the preheating unit 102 and the main heating unit 120 in a state where the image forming region of the first surface of the sheet member P and the member other than the sheet member P are not in contact with each other.

When heating the toner image transferred to the second surface, the preheating unit 102 heats the sheet member P such that the temperature of the first surface at the position S01 (see FIG. 5) is higher than the softening point of the toner.

The main heating unit 120 nips and conveys the sheet member P by the heating roller 130 and the pressing roller 140, so that the toner image is fixed to the second surface of the sheet member P. Here, in a state in which the leading end of the sheet member P is nipped between the heating roller 130 and the pressing roller 140, the rear end of the sheet member P is heated by the preheating unit 102. In other words, before the heating of the sheet member by the preheating unit 102 is completed, the main heating unit 120 starts to heat the sheet member P.

As described above, when heating the toner image transferred to the second surface, the preheating unit 102 heats the sheet member P such that the temperature of the first surface at the position S01 is higher than the softening point of the toner. That is, the temperature of the first surface before the sheet member P is nipped between the heating roller 130 and the pressing roller 140 of the main heating unit 120 is higher than the softening point of the toner.

Therefore, as compared with the case where the temperature of the first surface is equal to or lower than the softening point of the toner, the smoothness of the toner image on the first surface is increased by being nipped between the heating roller 130 and the pressing roller 140. In other words, as compared with a case where the temperature of the first surface is equal to or lower than the softening point of the toner, the glossiness of the toner image on the first surface is increased by being sandwiched between the heating roller 130 and the pressing roller 140.

Further, the cooling unit 90 receives the sheet member P having the toner images fixed on both surfaces thereof from the main heating unit 120, cools the sheet member P, and discharges the sheet member P to the discharging unit 52.

Here, in the case of double-sided printing, the evaluation of the relationship between the temperature of the first surface at the position S01 and the glossiness of the toner image will be described. In this evaluation, a black solid image was formed on the first surface of the sheet member P using a toner having a softening point of 75° C. FIG. 7 shows the evaluation results. In Comparative Examples 1 and 2 in which the temperature of the first surface at the position S01 was lower than the softening point of the toner, the glossiness (=gloss) was 45. On the other hand, in Example 1 in which the temperature of the first surface at the position S01 was higher than the softening point of the toner, the glossiness was 57, and the glossiness was 65 in Example 2. That is, the glossiness of Examples 1 and 2 were higher than those of Comparative Examples 1 and 2.

As described above, in the case of double-sided printing, by setting the temperature at the position S01 of the first surface where the toner image is fixed to the sheet member P to be higher than the softening point of the toner, the glossiness of the toner image formed on the first surface becomes high.

The glossiness was evaluated using a gloss meter (AG-4430 manufactured by BYK-Gardner). Specifically, the measurement was performed using the gloss meter at an incident angle of 60° in a method for measuring specular glossiness (JIS Z 8741: 1997), and a measured value was defined as the glossiness.

SUMMARY

As described above, in the case of double-sided printing, the temperature at the position S01 of the first surface where the toner image is fixed to the sheet member P is higher than the softening point of the toner. That is, when the toner forming the toner image on the first surface becomes soft and comes into contact with a member other than the sheet member P, the toner image is damaged. However, when the fans 172 blow air from below the sheet member P toward the sheet member P, the sheet member P is conveyed between the preheating unit 102 and the main heating unit 120 in a state where the image forming region of the first surface of the sheet member P and the member other than the sheet member P are not in contact with each other.

Therefore, in a configuration in which the temperature of the first surface of the sheet member P before the sheet member P is heated by the main heating unit 120 is higher than the softening point of the toner, damage to the toner image formed on the first surface is suppressed as compared with a case where the image forming region of the first surface of the sheet member P is in contact with a member other than the sheet member P between the preheating unit 102 and the main heating unit 120.

In the image forming device 10, when the preheating unit 102 heats the sheet member P to which the toner image is transferred to the second surface, the preheating unit 102 heats the sheet member P from the second surface side. As a result, the temperature of the second surface to which the unfixed toner image is transferred becomes higher than the temperature of the first surface. That is, the temperature of the second surface to which the unfixed toner image is transferred is higher than the softening point of the toner. Therefore, as compared with the case where the preheating unit heats the sheet member P from the first surface side, the toner constituting the toner image transferred to the second surface becomes softer, and the glossiness of the toner image formed on the second surface becomes higher.

In the image forming device 10, the fans 172 blow air toward the sheet member P from below the sheet member P, so that the conveyance posture of the sheet member P held and conveyed by the leading end portion is stabilized. Specifically, by blowing air to the sheet member P by the fans 172, the rear end of the sheet member P is prevented from being separated downward in the upper-lower direction from the conveyance path as compared with the case where the sheet member P is conveyed in a state of being bent by gravity. In this way, since the rear end of the sheet member P is prevented from being separated from the conveyance path, the region in which the member is arrangeable in an apparatus main body 10*a* of the image forming device 10 is increased as compared with the case where the sheet member P is conveyed in a state of being bent by gravity.

In the image forming device 10, the rear end of the sheet member P faces the preheating unit 102 in the upper-lower direction in a state where the leading end of the sheet member P having the minimum size is sandwiched between the nip portions N of the main heating unit 120. That is, when the main heating unit 120 starts to heat the sheet member P, the sheet member P is heated by the preheating unit 102. Therefore, when the main heating unit 120 starts to heat the sheet member P, the output of the preheating unit 102 becomes weaker than that in a case where heating of the sheet member P by the preheating unit 102 is finished.

Although the present invention is described in detail with reference to specific exemplary embodiments, it is apparent to those skilled in the art that the present invention is not limited to the exemplary embodiments, and various other embodiments may be taken within the scope of the present invention. For example, in the exemplary embodiment described above, by stabilizing the conveyance posture of the sheet member P by using the fans 172, the image forming region of the first surface and the member other than the sheet member P are in a non-contact state between the preheating unit 102 and the main heating unit 120. However, for example, by determining the disposition of member other than the sheet member P in consideration of the conveyance posture of the sheet member P conveyed by the chain gripper 66, the image forming region of the first surface of the sheet member P and the member other than the sheet member P may be in a non-contact state. In this case, the non-contact unit for bringing the image forming region of the first surface and the member other than the sheet member P into the non-contact state is a device main body having a space in which member other than the sheet member P is not disposed in the region through which the sheet member P passes.

In the above exemplary embodiment, by stabilizing the conveyance posture of the sheet member P by using the fans 172, the image forming region of the first surface of the sheet member P and the member other than the sheet member P are not in contact with each other between the preheating unit 102 and the main heating unit 120. However, by holding the rear end of the sheet member P, the image forming region of the first surface and the member other than the sheet member P may be in a non-contact state between the preheating unit 102 and the main heating unit 120. In this case, the non-contact unit that brings the image forming region of the first surface and the member other than the sheet member P into the non-contact state is a holding portion that holds the rear end of the sheet member P.

In the above exemplary embodiment, by stabilizing the conveyance posture of the sheet member P by using the fans 172, the image forming region of the first surface of the sheet member P and the member other than the sheet member P are not in contact with each other between the preheating unit 102 and the main heating unit 120. However, by holding both ends of the sheet member P in the width direction, the image forming region of the first surface and the member other than the sheet member P may be in a non-contact state between the preheating unit 102 and the main heating unit 120. In this case, the non-contact unit for bringing the image forming region of the first surface and the member other than the sheet member P into the non-contact state is a holding member that holds the both ends of the sheet member P in the width direction.

In the exemplary embodiment described above, the sheet member P is conveyed by the fans 172 from the preheating unit 102 to the main heating unit 120 in a state where the sheet surface faces the upper-lower direction. However, the sheet member P may be conveyed from the lower side to the upper side between the preheating unit 102 and the main heating unit 120 in a state in which the sheet surface faces the apparatus width direction. In this case, the conveyance posture of the sheet member P is stabilized without using the fans 172.

In the exemplary embodiment described above, in a state in which the leading end of the sheet member P having the minimum size in the conveyance direction of the sheet member P is sandwiched between the nip portions N of the main heating unit 120, the rear end of the sheet member P faces the preheating unit 102 in the upper-lower direction. However, in a state in which the leading end of the sheet member P having the maximum size in the conveyance direction of the sheet member P is sandwiched by the nip portions N of the main heating unit 120, the rear end of the sheet member P may face the preheating unit 102 in the upper-lower direction. However, in this case, the rear end of the sheet member P faces the preheating unit 102 in the upper-lower direction in a state in which the leading end of the sheet member P having the minimum size is sandwiched between the nip portions N of the main heating unit 120.

In the exemplary embodiment described above, the "temperature of the first surface of the sheet member P" is described, but when the toner image is formed on the first surface, the "temperature of the first surface of the sheet member P" is synonymous with the "temperature of the toner image formed on the first surface of the sheet member P". Similarly, in the exemplary embodiment described above, the "temperature of the second surface of the sheet member P" is described, but when the toner image is formed on the second surface, the "temperature of the second surface of the sheet member P" is synonymous with the "temperature of the toner image formed on the second surface of the sheet member P".

In the exemplary embodiment described above, the chain gripper 66 conveys the sheet member P in a substantially horizontal direction from the secondary transfer position NT to the main heating unit 120. However, the chain gripper 66 may convey the sheet member P at least in the horizontal direction from the secondary transfer position NT to the main heating unit 120, and the unfixed toner image surface may face upward. For example, the chain gripper 66 may convey the sheet member P so as to be inclined with respect to the horizontal direction from the secondary transfer position NT to the main heating unit 120. In this case, the sheet member P is conveyed by inclining of the sheet member such that the leading end of the sheet member P is located on the lower side in the upper-lower direction with respect to the rear end, but it is possible to prevent the posture of the sheet member P from changing due to the rear end of the sheet member P hanging downward in the upper-lower direction.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming device, comprising:

a transfer unit that transfers at least one toner image onto a recording medium being conveyed, the recording medium having a first surface and a second surface;

a main heating unit that is disposed at a downstream side of the transfer unit in a conveyance direction of the recording medium, heats the recording medium in contact with the recording medium, and fixes the at least one toner image to the recording medium;

a reversing unit that reverses front and back of the recording medium having a first toner image included in the at least one toner image fixed on the first surface of the recording medium by the main heating unit, and sends the recording medium to the transfer unit;

a preheating unit that is arranged between the transfer unit and the main heating unit in the conveyance direction of the recording medium and heats the recording medium in a non-contact state, the preheating unit being configured to heat the recording medium so that, when the recording medium that is sent to the transfer unit by the reversing unit and on which a second toner image included in the at least one toner image is transferred to the second surface is heated, a temperature of toner fixed on the first surface of the recording medium before the recording medium is heated by the main heating unit is higher than a softening point of a toner that is used for forming the first toner image and the second toner image on the recording medium;

a non-contact unit that brings a toner image forming region on the first surface of the recording medium on which the second toner image is transferred onto the second surface and a member other than the recording medium between the preheating unit and the main heating unit in a non-contact state; and a conveying unit configured to convey the recording medium along the horizontal direction by holding from a leading end of the recording medium, wherein the preheating unit is arranged above the recording medium being conveyed, a blowing unit that blows air to the recording medium is provided as the non-contact unit on an opposite side of the recording medium than the preheating unit so that the toner image forming region on the first surface of the recording medium, which is being conveyed between the preheating unit and the main heating unit and which has the second toner image transferred onto its second surface and the first toner image fixed onto its first surface, is not in contact with any member in a region between the preheating unit and the main heating unit so that a conveyance posture of the recording medium is stabilized horizontally only and both by the conveying unit and the blowing unit between the preheating unit and the main heating unit.

2. The image forming device according to claim 1, wherein, when heating the recording medium on which the second toner image is transferred to the second surface, the preheating unit heats the recording medium from a side of the second surface side of the recording medium.

* * * * *